(12) United States Patent
Lee et al.

(10) Patent No.: US 9,485,720 B2
(45) Date of Patent: Nov. 1, 2016

(54) METHOD AND DEVICE FOR CONTROLLING IDENTIFICATION OF A CELL IN COMMUNICATION SYSTEM

(71) Applicant: LG ELECTRONICS INC., Seoul (KR)

(72) Inventors: Sunyoung Lee, Anyang-si (KR);
Sungjun Park, Anyang-si (KR);
Sunghoon Jung, Anyang-si (KR);
Youngdae Lee, Anyang-si (KR);
Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 14/385,693

(22) PCT Filed: Mar. 22, 2013

(86) PCT No.: PCT/KR2013/002395
§ 371 (c)(1),
(2) Date: Sep. 16, 2014

(87) PCT Pub. No.: WO2013/147468
PCT Pub. Date: Oct. 3, 2013

(65) Prior Publication Data
US 2015/0110021 A1 Apr. 23, 2015

Related U.S. Application Data

(60) Provisional application No. 61/615,226, filed on Mar. 24, 2012.

(51) Int. Cl.
*H04W 4/00* (2009.01)
*H04W 48/16* (2009.01)
*H04W 8/26* (2009.01)
*H04L 5/00* (2006.01)

(52) U.S. Cl.
CPC ............ *H04W 48/16* (2013.01); *H04L 5/0053* (2013.01); *H04L 5/0091* (2013.01); *H04W 8/26* (2013.01); *H04L 5/0096* (2013.01)

(58) Field of Classification Search
None
See application file for complete search history.

(56) References Cited

U.S. PATENT DOCUMENTS

| 2008/0102896 A1* | 5/2008 | Wang ..................... H04W 36/34 455/560 |
| 2012/0057544 A1* | 3/2012 | Xu ............................ H04L 1/00 370/329 |

OTHER PUBLICATIONS

Huawei, "TAG Change Scenarios," 3GPP TSG-RAN WG2 Meeting #75bis, R2-115004, Oct. 2011, 5 pages.
CATT, "Signaling for TAG configuration," 3GPP TSG RAN WG2 Meeting #76, R2-115791, Nov. 2011, 5 pages.
Nokia Siemens Networks, et al., "TA group signalling," 3GPP TSG-RAN WG2 Meeting #76, R2-115805, Nov. 2011, 3 pages.
HTC, "Clarification on sCell index removal," 3GPP TSG-RAN2 Meeting #77, R2-120081, Feb. 2012, 3 pages.
Fujitsu, "Further consideration on the TAG change procedure," 3GPP TSG RAN WG2 Meeting #77, R2-120731, Feb. 2012, 5 pages.
PCT International Application No. PCT/KR2013/002395, Written Opinion of the International Searching Authority dated Jun. 25, 2013, 1 page.

* cited by examiner

*Primary Examiner* — Chi H Pham
*Assistant Examiner* — Raul Rivas
(74) *Attorney, Agent, or Firm* — Lee, Hong, Degerman, Kang & Waimey

(57) ABSTRACT

A method for controlling identification of a cell in a communication system may be proposed. The method may include: setting a cell by using a first cell index in user equipment (UE); receiving, by the UE, a control signal indicating that a cell index is changed from the first cell index to a second cell index; and setting the cell by using the second cell index without releasing the cell by the UE.

10 Claims, 10 Drawing Sheets

METHOD AND DEVICE FOR CONTROLLING IDENTIFICATION OF A CELL IN COMMUNICATION SYSTEM

CROSS-REFERENCE TO RELATED APPLICATIONS

This application is the National Stage filing under 35 U.S.C. 371 of International Application No. PCT/KR2013/002395, filed on Mar. 22, 2013, which claims the benefit of U.S. Provisional Application Ser. No. 61/615,226, filed on Mar. 24, 2012, the contents of which are all hereby incorporated by reference herein in their entirety.

BACKGROUND OF THE INVENTION

1. Field of the Invention

The present invention relates to a technique for controlling an identification that identifies a cell, and more particularly, to a method and apparatus which is usable in case of changing an identification identifying a cell.

2. Related Art

One of the requirements in wireless communication systems is to support high data transmission rate. For this, various technologies have been researched such as multiple input multiple output (MIMO), cooperative multiple point transmission (CoMP), relay, carrier aggregation, and so on.

The carrier aggregation (CA) is a concept that multiple bands are combined into one system. In this case, each band that is available to be operated independently may be called component carrier (CC). The multiple carriers may correspond to multiple cells, and the cells may be managed with being distinguished to various sort of cells such as a primary cell and a secondary cell.

SUMMARY OF THE INVENTION

The present specification is suggested to improve a technique for changing identification that identifies a cell, for example, an index that identifies a cell. Particularly, for the CA technology of LTE system that uses multiple uplink timing synchronization, the present specification suggests a method and apparatus for changing a cell identification in the state of maintaining the connection (for example, RRC or MAC connection) of a specific cell (for example, sub serving cell/secondary cell).

The present specification provide a method of control TAGs of a cell. In detail, a method of controlling identification of a cell in a communication system is provided. The method comprises: configuring, at a user equipment (UE), a cell by using a first cell index; receiving, at the UE, control signal indicating change in cell index from the first cell index to a second index; and configuring, at the UE, the cell by using the second cell index without releasing the cell.

Additionally or alternatively, the communication system employs a primary cell and a secondary cell, wherein the cell is the secondary cell, the first cell index is a first secondary cell index, and the second cell index is a second secondary cell index.

Additionally or alternatively, the control signal is radio resource control (RRC) or medium access control (MAC) signaling.

Additionally or alternatively, the control signal is an RRC connection reconfiguration message.

Additionally or alternatively, the control signal indicates the first cell index and the second cell index.

Additionally or alternatively, the control signal comprises an updated configuration applicable to the cell.

Additionally or alternatively, the cell is configured based on at least one configuration, which includes information on downlink and/or uplink bandwidth, information on time division duplex (TDD) configuration, and information on cross-carrier scheduling.

Additionally or alternatively, a first configuration and a second configuration are applied to the cell.

Additionally or alternatively, the method further comprises: if the control signal comprises an updated configuration of the first configuration, applying the updated configuration of the first configuration to the cell.

Additionally or alternatively, if the control signal does not comprise an updated configuration of the second configuration, the second configuration applied to the cell is maintained at the UE.

The present specification also provides a user equipment (UE) for controlling identification of a cell in a communication system.

The UE comprises: a transceiver configured to receive and/or transmit a signal; and a processor coupled to the transceiver and configured to: configure a cell by using a first cell index; receive control signal indicating change in cell index from the first cell index to a second index; and configure the cell by using the second cell index without releasing the cell.

DESCRIPTION OF EXEMPLARY EMBODIMENTS

The present document provides a method and apparatus for controlling and transmitting a timer in a wireless communication system that supports carrier aggregation (CA) in wireless communication systems. The present document is described based on 3GPP LTE and its evolution that support the carrier aggregation (CA) to clarify descriptions, but not limited thereto.

Long Term Evolution (LTE) suggested by $3^{rd}$ Generation Partnership Project (3GPP) standardization organization is a part of evolved-UMTS (e-UMTS) that uses Evolved-Universal Terrestrial Radio Access Network (E-UTRAN), Orthogonal Frequency Division Multiple Access (OFDMA) is adopted in downlink and Single Carrier-Frequency Division Multiple Access (SC-FDMA) is adopted. LTE-advanced (LTE-A) is the evolution of LTE.

Figure 1:
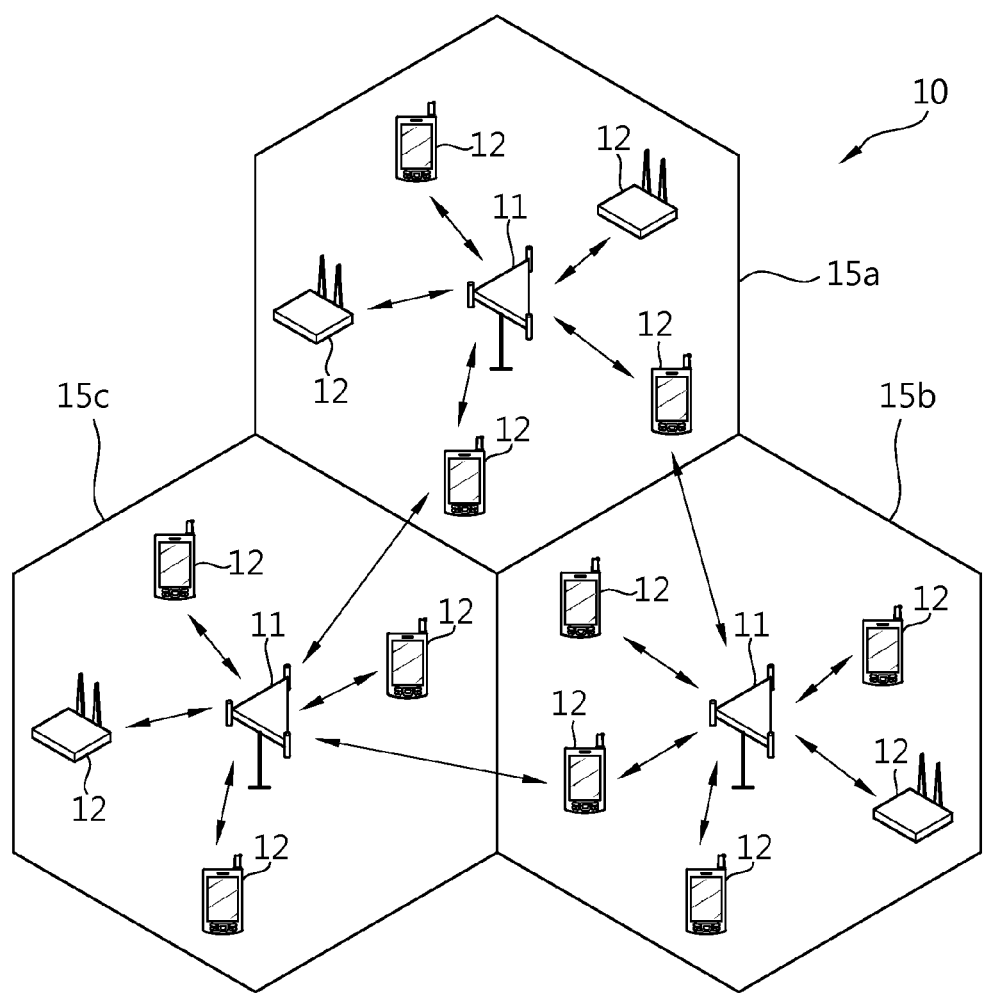
FIG. 1 shows a wireless communication system.

FIG. 1 shows a wireless communication system.

Referring to FIG. 1, the wireless communication system 10 includes at least one base station (BS) 11. Respective BSs 11 provide a communication service to particular geographical regions 15, which are generally called cells. Each cell may be divided into a plurality of regions, and respective regions are called sectors. One or more cells may be existed in a BS. Generally, the BS 11 refers to a fixed station that communicates with a user equipment 13, and may be called other terms such as an evolved NodeB (eNB), a Base Transceiver System (BTS), an Access Point (AP), an Access Network (AN), and so on.

A user equipment (UE) 12 may be fixed or mobile, and may be referred to by other names such as a Mobile Station (MS), a User Terminal (UT), a Subscriber Station (SS), a Wireless Device, a Personal Digital Assistant (PDA), a Wireless Modem, a Handheld Device, an Access Terminal (AT), and so on.

Hereinafter, downlink (DL) refers to transmission from the BS 11 to the UE 12 and uplink refers to transmission from the UE 12 to the BS 11.

The wireless communication system 10 may be a system that supports bidirectional communication. The bidirectional communication system may be performed using a Time Division Duplex (TDD) mode and a Frequency Division Duplex (FDD) mode. The TDD mode uses different time resources in UL transmission and DL transmission. The FDD mode uses different frequency resources in UL transmission and DL transmission. The BS 11 and the UE 12 communicate each other using radio resources which are called radio frames.

The system shown in FIG. 1 may be implemented by LTE system. In this case, the structure of LTE system may be divided into Evolved UMTS Terrestrial Radio Access Network (E-UTRAN) and Evolved Packet Core (EPC). The E-UTRAN is comprised of a user equipment (UE) and an Evolved NodeB (eNB), the interface between the UE and the eNB is called Uu interface, and the interface between the eNB and the other eNB is called X2 interface. The EPC may be comprised of a Mobility Management Entity (MME) that is in charge of the Control-plane function and a Serving Gateway that is in charge of the User-plane function. Meanwhile, the interface between the eNB and the MME is called S1-MME interface, the interface between the eNB and the S-GW is called S1-U interface, and these two are commonly called S1 interface.

Figure 2:
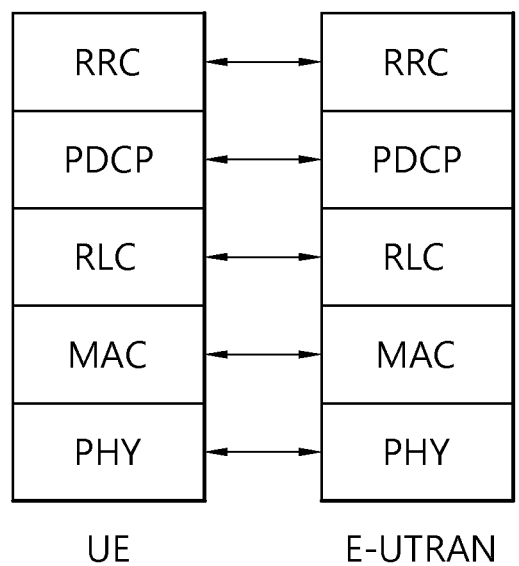
FIG. 2 is a block diagram illustrating the control plane of radio interface protocol.
Figure 3:
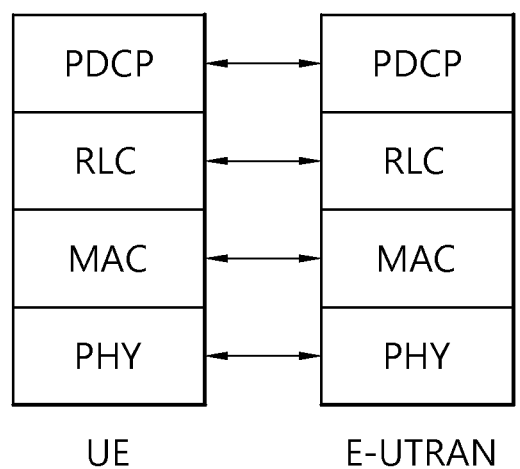
FIG. 3 is a block diagram illustrating the user plane of radio interface protocol.

In Uu interface which is a wireless section, Radio Interface Protocol is defined. This is comprised of a Physical Layer, a Data Link Layer and a Network Layer, horizontally, and comprised of a User Plane (U-plane) for transmitting user data and a Control Plane (C-plane) for transmitting control signal (Signaling), vertically. Such a Radio Interface Protocol, as shown in FIG. 2 and FIG. 3, may be distinguished by L1 (the first layer) including the PHY, the physical layer, L2 (the second layer) including the MAC/RLC/PDCP layer, and L3 (the third layer) including the RRC layer, based on the lower 3 layers of the Open System Interconnection (OSI) standard model, which is widely known in communication systems. These exist as pairs in the UE and the E-UTRAN, and are in charge of data transmission of the Uu interface.

FIG. 2 is a block diagram illustrating the control plane of radio interface protocol.

FIG. 3 is a block diagram illustrating the user plane of radio interface protocol.

Each of the layers will now be described with referring to FIG. 2 and FIG. 3.

The Physical layer (PHY), the first layer, provides Information Transfer Service to the higher layer using Physical Channel. The PHY layer is connected to the higher Medium Access Control (MAC) layer through the Transport Channel, and data are transmitted between the MAC layer and the PHY layer through the transmission channel. In this time, the transmission channel is divided into a dedicated transmission channel and a common transmission channel, largely according to whether the channel is shared. And between different PHY layers, that is, between the PHY layers at transmitter's side and receiver's side, data are transmitted through the physical layer using radio resources.

Various channels are existed in the second layer. First, the Medium Access Control (MAC) layer plays the role of mapping various Logical Channels to the various transmission channels, also plays the roles of Multiplexing logical channels which is mapping several logical channels to a transmission channel. The MAC layer is connected to the higher layer, RCL layer through Logical Channel, and the Logical Channel is largely divided into a Control Channel through which the information of the Control Plane is transmitted and a Traffic Channel through which the information of the User Plane is transmitted, according to the kind of the information which is transmitted.

The Radio Link Control (RLC) layer in the second layer plays the role of regulating the size of data in order to be adequate to transmit data to radio section via lower layer by performing segmentation and concatenation of the data received from the higher layer. In addition, in order to guarantee various QoS that each of the Radio Bearers (RBs) require, three operation modes including Transparent Mode (TM), Un-acknowledged Mode (UM) and Acknowledged Mode (AM) are provided. Particularly, the AM RLC performs the retransmission function through the Automatic Repeat and Request (ARQ) function for reliable data transmission.

The Packet Data Convergence Protocol (PDCP) layer in the second layer performs the Header Compression function for decreasing the header size of the IP packet containing relatively big and unnecessary control information in order to effectively transmit through radio section whose bandwidth is narrow when transmitting IP packet such as IPv4 and IPv6. This plays the role of increasing transmission efficiency in the radio section by transmitting only necessary information in the Header part of data. Also, in LTE system, the PDCP layer plays the role of Security, this is comprised of Ciphering that prevents monitoring of data by a third party and Integrity protection that prevents manipulation of data by a third party.

The Radio Resource Control (RRC) layer located the most upper part of the third layer is defined only on the control plane, and in charge of controlling of the logical channel, transmission channel and the physical channel in relation to the Configuration, Re-configuration and Release of the Radio Bearers (RBs). Here, the RB means a logical path which is provided by the first and second layer of the radio protocol for data transmission between a UE and the UTRAN. Generally, configuring a RB means to the procedure of defining the characteristics of the radio protocol layer and channel which is required to provide a specific service and configuring the respective particular parameters and operation methods. The RB is divided into a Signaling RB (SRB) and a Data RB (DRB), the SRB is used for the path for transmitting the RRC message in the control plane (C-plane), and the DRB is used for the path for transmitting the user data in the user plane (U-plane).

Hereinafter, the Carrier Aggregation in LTA-A system will be described. For the convenience of description, the Carrier Aggregation will be abbreviated to CA below.

LTE-A technology standard is a candidate technology for IMT-Advanced of International Telecommunication Union (ITU), and is designed to fulfill the technological requirement of IMT-Advanced of ITU. According to this, in order to satisfy the requirements of ITU, the discussion for expanding the bandwidth in comparison with the existing LTE system has been progressed. In order to expand the bandwidth in the LTE system, a carrier that may be included in the existing LTE system is defined as a component carrier (hereinafter, it is referred to as CC). It is discussed that the maximum 5 CCs can be used up to Release-11 (Rel-11). For reference, a serving cell may be comprised of a downlink CC and an uplink CC. Or a serving cell can be comprised of a downlink CC. As CC may have the maximum 20 MHz bandwidth same as the LTE system, in case of aggregating 5 CCs, the bandwidth can be expanded to the maximum 100 MHz, and the technology that aggregates the multiple CCs is referred to as CA.

Figure 4:
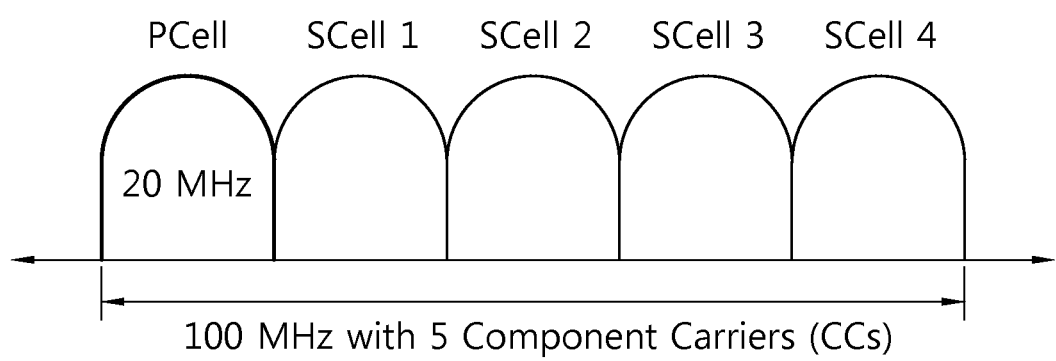
FIG. 4 illustrates the CA technology that is applicable in the LTE-A system.

FIG. 4 illustrates the CA technology that is applicable in the LTE-A system.

In case that the CA technology is applied, there exists a RRC connection between a UE and a network. Among a plurality of serving cells that are configured for a UE to use, the serving cell that provides the mobility information (e.g., TAI) of security input (e.g., ECGI, PCI and ARFCN) and Non-Access-Stratum (NAS) in order to establish and re-establish the RRC connection is referred to as a Primary Serving Cell (Pcell), and the rest of cells are referred to as Secondary Serving Cells (Scell). In the present specification, the PCell may be referred to as a primary cell, and the SCell be referred to as a secondary cell.

Figure 5:
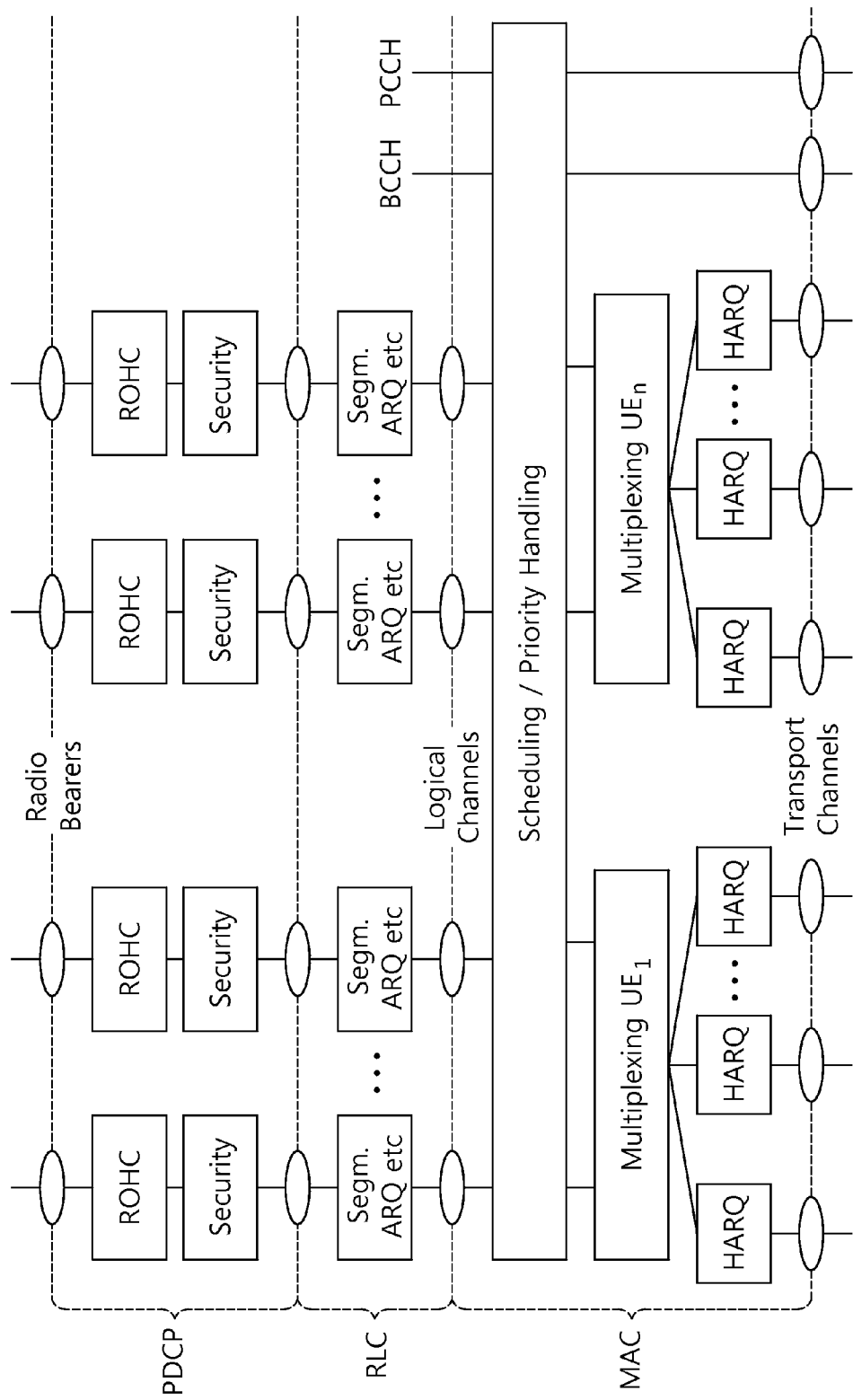
FIG. 5 illustrates the second downlink layer that is designed for consideration of the CA technology.

FIG. 5 illustrates the second downlink layer that is designed for consideration of the CA technology.

Figure 6:
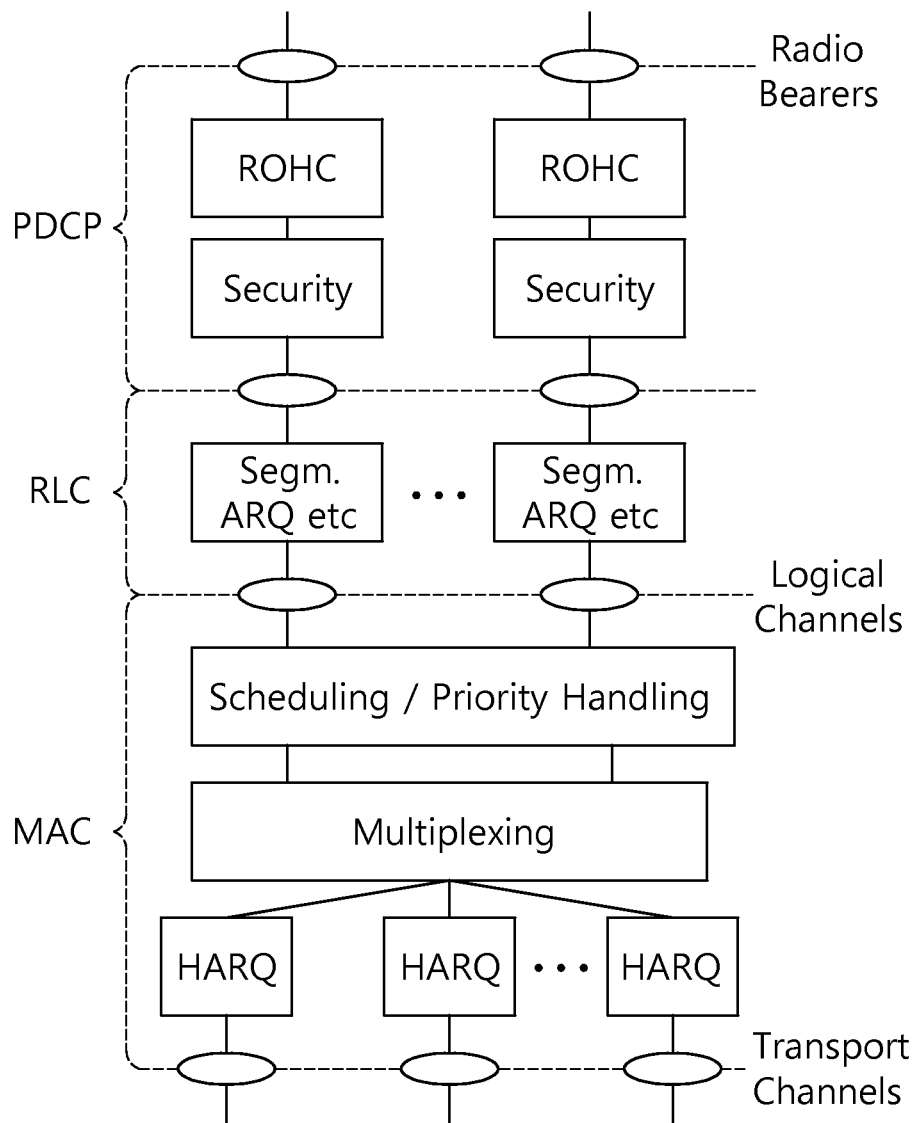
FIG. 6 illustrates the second uplink layer that is designed for consideration of the CA technology.

FIG. 6 illustrates the second uplink layer that is designed for consideration of the CA technology.

The CA technology has much effect on the MAC layer of the Layer 2. For example, as a plurality of CCs are used in CA and an individual HARQ manages a CC, operations related to the multiple HARQ individuals should be performed in the MAC layer of the LTE-A system. Additionally, as respective HARQs have a separate transport block, a plurality of transport blocks can be transmitted or received at the same time through the multiple CCs in CA.

Hereinafter, the Activation/Deactivation of the sub serving cell (that is, the secondary cell) in the CA technology will be described.

In case that a UE uses a plurality of serving cells by applying the CA technology, a BS may add or remove the sub serving cell depending on the UL/DL traffic condition of the UE. In addition, in order to optimize the signaling overhead that adds or removes the sub serving cell, the BS may control the activation state of the sub serving cell instead of removing the sub serving cell. The sub serving cell in the deactivation state may have the following characteristics.

The SRS is not transmitted from the corresponding sub serving cell.
The CQI/PMI/RI/PTI for the corresponding sub serving cell are not transmitted.
The UL data are not transmitted from the corresponding sub serving cell.
The PDCCH is not monitored in the corresponding sub serving cell.
The PDCCH for the corresponding sub serving cell is not monitored.

Hereinafter, a method for configuring a sub serving cell will be described.

For example, a BS may add a sub serving cell which is to be used by a UE through the RRC Connection Reconfiguration process, modify or release the configuration of the sub serving cell which is on use. When a BS newly adds the sub serving cell which is to be used by a UE, the BS allocates a sub serving cell identification (for example, an index represented as SCellIndex) having the value from 1 to the sub serving cell maximum number for the corresponding sub serving cell. For reference, the identification of the main serving cell may be 0. The sub serving cell identification may be used, in case of releasing the sub serving cell which is being used by a UE or changing the configuration of a certain sub serving cell, for notifying which sub serving cell is to be released and which configuration of the sub serving cell is to be modified. In describing particularly, a BS transmits the RRC signal (RRC Connection Reconfiguration) including a sub serving cell index (sCellIndex), cellIdentification and the configuration information for the sub serving cell. The sCellIndex means index information of a number bit which is used for identifying a cell in a UE. On the contrary, the cellIdentification is identification information which is used for uniquely identifying a cell.

The configuration information of the sub serving cell includes the configuration information of a UE for operating the sub serving cell such as UL/DL bandwidth of the sub serving cell, system information related to the TDD configuration and cross-carrier scheduling information, and the like.

If a sub serving cell identification which is not being used is included in the sub serving cell addition/modification list (for example, a list implemented by sCellToAddModList) which is transmitted through RRC signal (for example, RRC Connection Reconfiguration), a UE may add the sub serving cell according to the sub serving cell configuration information and the cellIndentification. If the sub serving cell which is already being used is included in the sub serving cell addition/modification list, the UE updates the configuration information of the corresponding sub serving cell according to the received sub serving cell configuration information.

In case that a UE receives the RRC signal (RRC Connection Reconfiguration) including the sub serving cell release list (sCellToReleaseList), the UE releases the sub serving cell that corresponds to the sub serving cell identification which is included in the list.

As described above, a BS is to modify the sub serving cell identification of the sub serving cell in the process that the BS manages the sub serving cell configured for a UE, after the BS releases the corresponding sub serving cell, the BS should add the sub serving cell again by allocating the sub serving cell identification having different value. Such a process is not preferable in the aspect of signaling overhead for reconfiguring the corresponding sub serving cell as well as it causes delay in data transmission in the corresponding serving cell. Therefore, for a specific sub serving cell, a mechanism is required that can modify only the sub serving cell identification without delaying the data transmission in the state that the configuration information of the sub serving cell is maintained.

For this, in the present specification, the technique of modifying the identification of a cell, in particular, the index of a cell (that is, serving cell) is suggested. In detail, a technique is suggested that a UE receives the control signal (for example, RRC connection reconfiguration message) indicating a modification in the cell index from a first cell index to a second index from a BS, and accordingly, configures the cell by using the second cell index without releasing the cell.

Hereinafter, for the convenience of description, it will be described based on the case that the cell is a sub serving cell, that is, a secondary cell, and the cell index is a secondary cell index.

That is, in the present specification, as a method for modifying the serving cell identification of the serving cell which is being used by a UE, the method is suggested that the UE can newly allocate new serving cell identification (that is, new cell index) in the state that the configuration of a specific serving cell. That is, a BS transmits the secondary cell identification (for example, represented by SCellIndex_new) which is to be newly allocated to the specific serving cell to a UE.

For the operation, the BS may transmit the RRC signal (for example, RRC Connection Reconfiguration) including SCellIndex_new to the UE. Or, the BS may newly define the RRC signal or the MAC signal that modifies the secondary cell identification, if it is determined that it is required to modify the cell identification for the specific serving cell, the BS may transmit the secondary cell identification modification signal including SCellIndex_new to the UE.

The control signal that the BS transmits to the UE may include the serving cell identification information (for example, represented as SCellIndex_old) allocated to the serving cell that tries to modify the serving cell identification in order to notify which serving cell's identification should be modified by the UE. That is, by indicating the conventional cell identification/index, the BS may notify which identification/index of the cell is modified by the UE.

Additionally, the control signal may include the configuration information related to the serving cell whose identification/index is modified. The configuration information may be called secondary cell configuration information.

When the UE receives the control signal including the existing identification information (that is, SCellIndex_old) and new identification information (that is, SCellIndex_new) for a serving cell, the UE may perform the following operations.

First, the UE determines to modify the serving cell identification of the serving cell. That is, the UE changes the serving cell identification of the serving cell corresponding to the existing identification information (SCellIndex_old) to new identification information (SCellIndex_new). That is, even though there is no additional bit/signal, if the existing identification and new identification are included in the control signal at the same time, the UE may notice that the related signaling is used for changing the identification/index of the call.

Additionally, if the control signal includes the secondary cell configuration information, the UE determines to modify the secondary cell configuration information which is applicable to the secondary cell. That is, for the cell whose secondary cell identification is changed, the UE may update the secondary cell configuration information by reflecting the received configuration information (that is, the secondary cell configuration information) through the control signal, and maintain the configuration information which is not updated.

The technical features described above can be described by following FIG. 7 to FIG. 10.

For the convenience of description, the SCellIndex_old may be represented as a first secondary cell index and the SCellIndex_new may be represented as a second secondary cell index.

Figure 7:
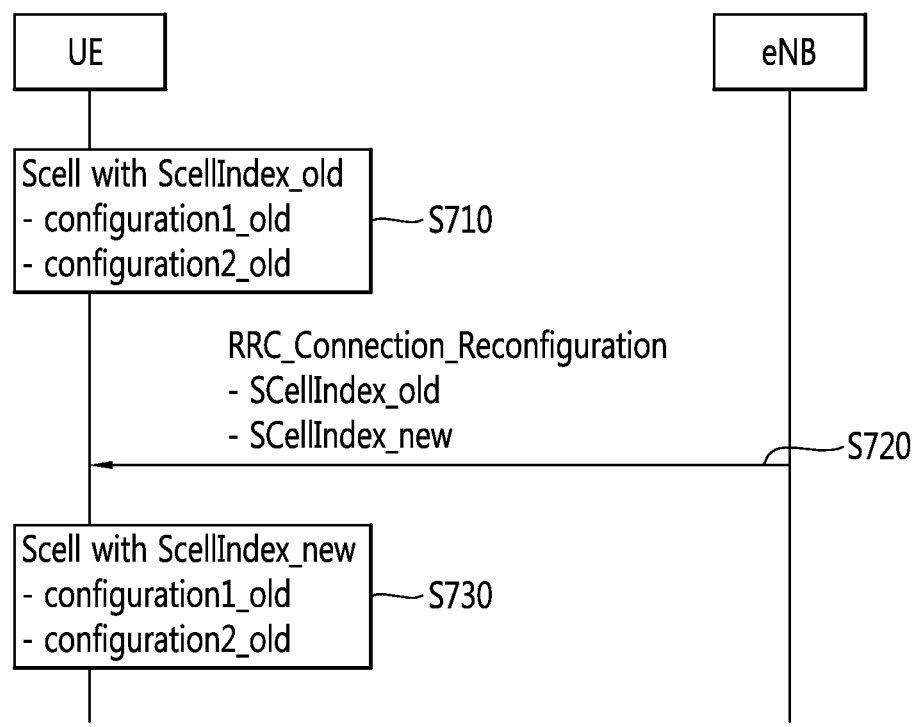
FIG. 7 illustrates the operation according to the present specification.

FIG. 7 illustrates the operation according to the present specification.

As shown in step, S710, a UE may use the serving cell whose serving cell identification is SCellIndex_old. That is, the UE may configure a cell using the first secondary cell index. Meanwhile, the cell may be configured based on Configuration1_old and Configuration2_old. In this case, the Configuration1_old may be represented by a first configuration, and the Configuration2_old may be represented by a second configuration.

As shown in step, S720, the control signal indicating that the secondary cell index is changed from the first secondary cell index to the second secondary cell index may be received from the UE. That is, the BS may determine to modify the identification of the cell and transmit the control signal (for example, the RRC signal) that indicates the first secondary cell index (that is, SCellIndex_old), which is the previous identification of the cell and the second secondary cell index (that is, SCellIndex_new), which is new identification to the UE. As shown in the drawing, the control signal may be the RRC connection reconfiguration message.

As shown in step, S730, when the UE receives the control signal (for example, the RRC signal) from the BS, the UE changes the cell identification of the corresponding cell index to the second secondary cell index, that is, SCellIndex_new.

Figure 8:
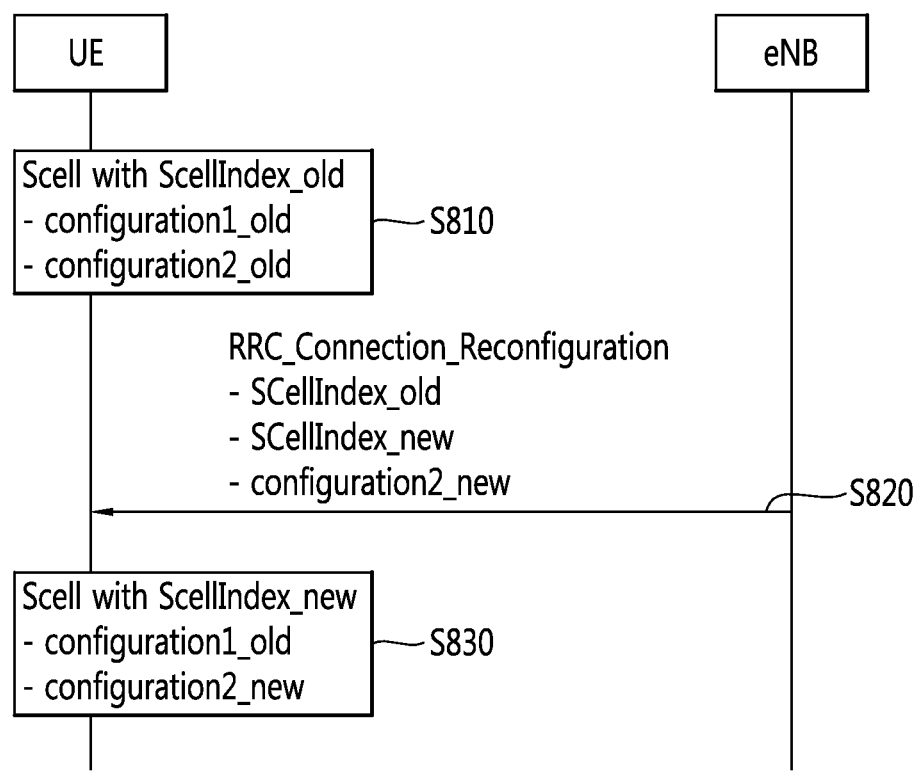
FIG. 8 illustrates an example of applying new configuration to a cell while modifying the secondary cell index according to the present specification.

FIG. 8 illustrates an example of applying new configuration to a cell while modifying the secondary cell index according to the present specification.

As shown in step, S810, a UE may use the serving cell whose serving cell identification is SCellIndex_old. That is, the UE may configure the cell using the first secondary cell index. Meanwhile, the cell is configured based on Configuration1_old and Configuration2_old. That is, the first configuration (Configuration1_old) and the second configuration (Configuration2_old) may be applied to the cell by the UE.

As shown in step, S820, a BS may determine to modify the cell identification of the cell, and transmit the control signal (for example, the RRC signal) that indicates the first secondary cell index (that is, SCellIndex_old), which is the previous identification of the cell and the second secondary cell index (that is, SCellIndex_new), which is new identification to the UE. In this case, the BS may determine that it is required to update the second configuration among the configuration information of the corresponding serving cell. In this case, the BS transmits the control signal (that is, the RRC signal) with Configuration2_new, which is new configuration information being included to the UE. That is, the Configuration2_new includes the updated information for the second configuration.

As shown in step, S830, if the UE receives the control signal (that is, the RRC signal) from the BS, the UE may change the serving cell identification that corresponds to SCellIndex_old to SCellIndex_new. That is, the first secondary cell index is changed to the second secondary cell index. In addition, the UE may update the configuration information of the serving cell based on the received Configuration2_new information. That is, the Configuration2 among the configuration information of the serving cell may be updated from Configuration2_old to Configuration2_new. And, the configuration information (Configuration1) which is not received may be maintained with the existing configuration.

As described above, in case that the BS determines to change the serving cell identification for a specific serving cell, the BS may transmit the RRC or the MAC signal including the serving cell identification information (SCellIndex_old) of the secondary cell whose serving cell identification is to be changed and new serving cell identification (SCellIndex_new) to the UE. The UE that receives the corresponding signal applies the new serving cell identification without performing the process of release or addition for the secondary cell. Through this, the secondary cell configuration information of the corresponding cell may be maintained and the serving cell identification may be changed at the same time.

Figure 9:
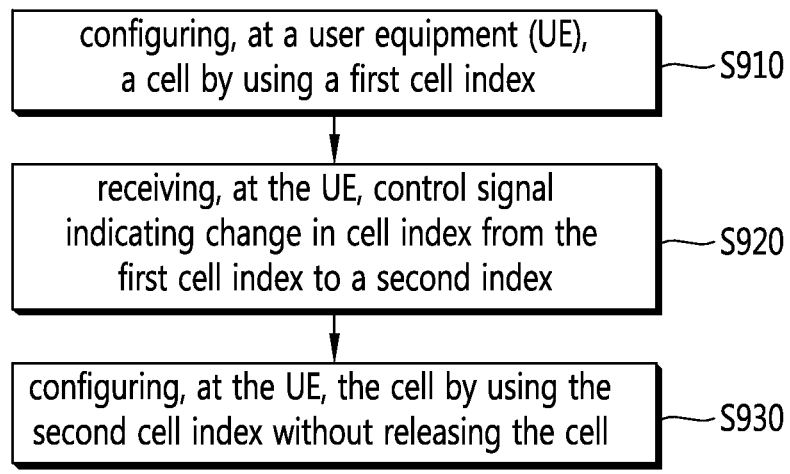
FIG. 9 is a flow chart illustrating the technique according to the present specification.

FIG. 9 is a flow chart illustrating the technique according to the present specification.

As shown in step, S910, a user equipment (UE) configures a cell using the first cell index. As described above, the cell may be the secondary cell, the first cell index may be the first secondary cell index, and the second cell index may be the secondary cell index.

As shown in step, S920, the UE receives the control signal indicating that the cell index is changed from the first cell index to the second cell index. The control signal may be radio resource control (RRC) signaling or medium access control (MAC) signaling. Also, the control signal may be RRC connection reconfiguration message.

Meanwhile, the control signal may indicate the first cell index and the second cell index. In case that the first cell index and the second cell index are indicated by the control signal at the same time, the UE may notice that its cell index is to be changed.

In addition, the control signal may include the updated configuration which is applicable to the cell. The cell may be configured based on at least one configuration, and an example of the configuration may be information of DL and/or UL bandwidth, information of time division duplex (TDD), and/or information of cross-carrier scheduling.

As shown in step, S930, the UE configures the cell using the second cell index instead of releasing the cell.

Meanwhile, in case that the configuration applied to the cell is update, the BS may transmit only the configuration which is to be updated with being included in the control information to the UE. The UE may apply the updated configuration to the cell, and maintain the previous configuration for the configuration which is not included in the control signal.

Figure 10:
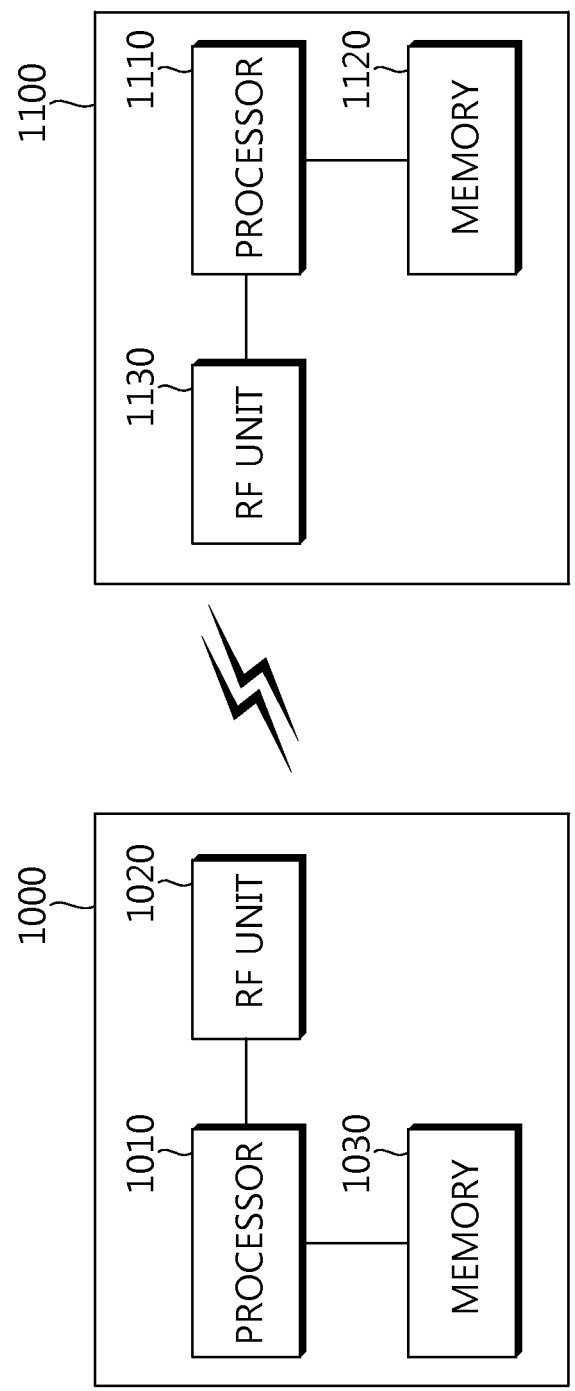
FIG. 10 is an example of a device in which the above-described technique is applied.

FIG. 10 is an example of a device in which the above-described technique is applied. The above-described technique may be implemented by a UE 1000, which is a device that transmits control information through UL. The UE 1000 may communicate with the BS 1100.

The UE 1000 includes a processor 1010, a memory 1030, and a radio frequency (RF) unit 1020. The processor 1010 may allocate radio resources according to the information provided from outside and the information stored inside beforehand. Among the embodiments described above, the process, technique and function performed by the UE may be implemented by the processor 1010. The memory 1030 is coupled to the processor 1010, and stores a variety of information for driving the processor 1010. The RF unit 1020 is coupled to the processor 1010, and transmits and/or receives a radio signal.

The BS 1100 that communicates with the UE includes a processor 1110, a memory 1120, and an RF unit 1130. Among the embodiments described above, the process, technique and function performed by the BS may be implemented by the processor 1110. The memory 1120 is coupled to the processor 1110, and stores a variety of information for driving the processor 1110. The RF unit 1130 is coupled to the processor 1110, and transmits and/or receives a radio signal.

The processors 1010 and 1110 may include an application-specific integrated circuit (ASIC), a separate chipset, a logic circuit, a data processing unit, and/or a converter for mutually converting a baseband signal and a radio signal. The memories 1030 and 220 may include a read-only memory (ROM), a random access memory (RAM), a flash memory, a memory card, a storage medium, and/or other equivalent storage devices. The RF units 1020 and 1130 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 1030 and 1120 and may be performed by the processors 1010 and 1110. The memories 1030 and 1120 may be located inside or outside the processors 1010 and 1110, and may be coupled to the processors 1010 and 1110 by using various well-known means.

The method and apparatus described above may be implemented by hardware, software or the combination thereof. For implementing with hardware, the method and apparatus may be implemented by an application-specific integrated circuit (ASIC), a digital signal processing (DSP), a programmable logic device (PLD), a field programmable gate array (FPGA), a processor, a controller, a microprocessor, other electronic unit or the combination thereof. For implementing with software, the method and apparatus may be implemented by a module that performs the function. The software may be stored in a memory unit and performed by a processor. As for the memory unit or the processor, various means well known for the skilled in the art may be adopted.

What is claimed is:

1. A method of controlling identification of a cell in a communication system employing a primary cell and a secondary cell, the method comprising:
configuring, at a user equipment (UE), the secondary cell by using a first secondary cell index;
receiving, at the UE, control signal indicating change in secondary cell index from the first secondary cell index to a second secondary cell index; and
configuring, at the UE, the secondary cell by using the second secondary cell index without releasing the secondary cell.

2. The method of claim 1, wherein the control signal is radio resource control (RRC) or medium access control (MAC) signaling.

3. The method of claim 1, wherein the control signal is an RRC connection reconfiguration message.

4. The method of claim 1, wherein the control signal indicates the first secondary cell index and the second secondary cell index.

5. The method of claim 1, wherein the control signal comprises an updated configuration applicable to the secondary cell.

6. The method of claim 1, wherein the secondary cell is configured based on at least one configuration, which includes information on downlink and/or uplink bandwidth, information on time division duplex (TDD) configuration, and information on cross-carrier scheduling.

7. The method of claim 1, wherein a first configuration and a second configuration are applied to the secondary cell.

8. The method of claim 7, further comprising:
if the control signal comprises an updated configuration of the first configuration, applying the updated configuration of the first configuration to the secondary cell.

9. The method of claim 8, wherein if the control signal does not comprise an updated configuration of the second configuration, the second configuration applied to the secondary cell is maintained at the UE.

10. A user equipment (UE) for controlling identification of a cell in a communication system employing a primary cell and a secondary cell, the UE comprising:
   a transceiver configured to receive and/or transmit a signal; and
   a processor coupled to the transceiver and configured to:
      configure the secondary cell by using a first secondary cell index;
      receive control signal indicating change in secondary cell index from the first secondary cell index to a second secondary cell index; and
      configure the secondary cell by using the second secondary cell index without releasing the secondary cell.

* * * * *